April 10, 1945. T. C. ATCHISON 2,373,528
METHOD OF RECOVERING MAGNESIUM COMPOUNDS
Filed Aug. 13, 1941
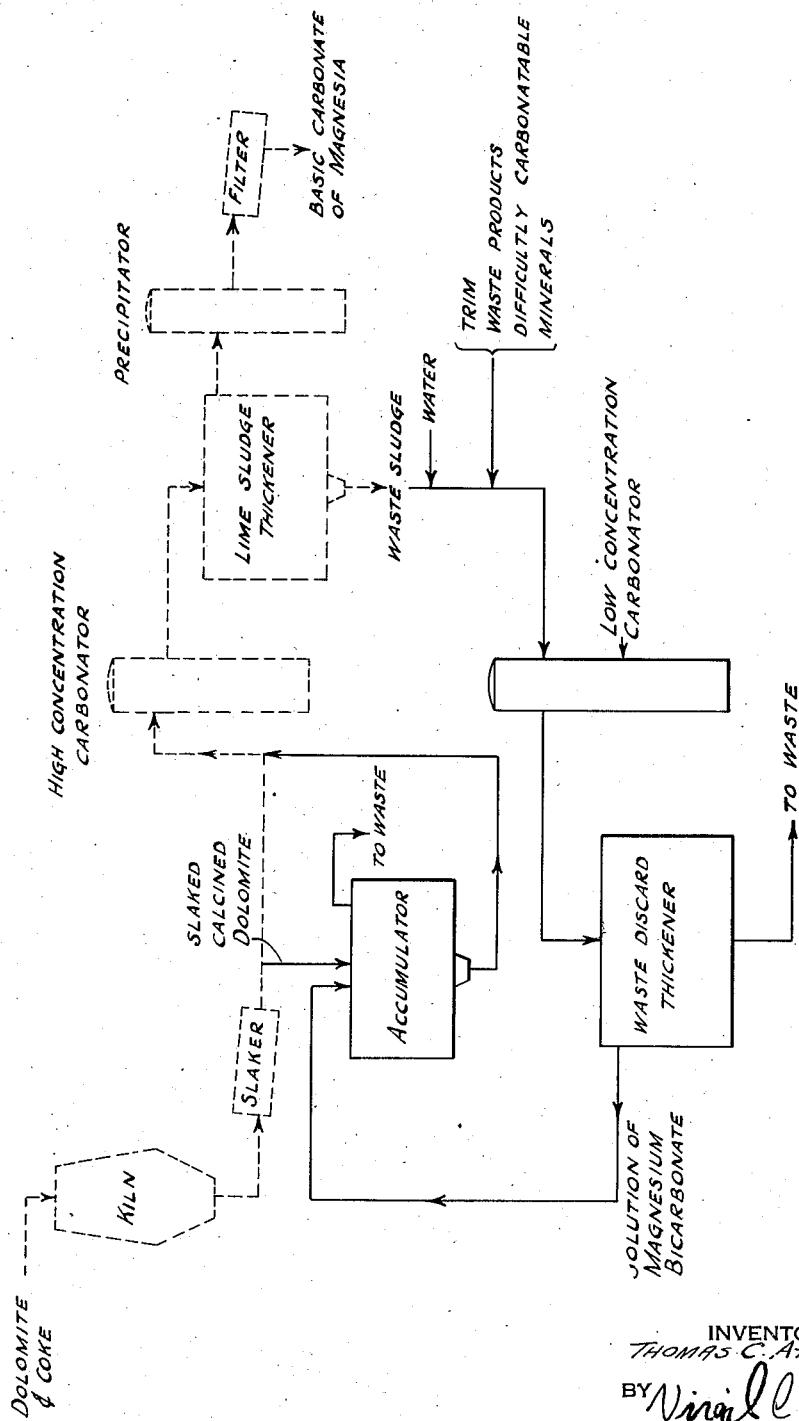
INVENTOR
THOMAS C. ATCHISON
BY Virgil C Kline
ATTORNEY Patented Apr. 10, 1945

2,373,528

UNITED STATES PATENT OFFICE 2,373,528

METHOD OF RECOVERING MAGNESIUM COMPOUNDS

Thomas C. Atchison, Princeton, N. J., assignor to Johns-Manville Corporation, New York, N. Y., a corporation of New York Application August 13, 1941, Serial No. 406,577

5 Claims. (Cl. 23—67)

This invention relates to magnesium carbonate compositions of the type suitable for insulating purposes. It relates particularly to a method of recovering magnesium compounds from materials previously wasted and utilizing the recovered materials in the process of manufacturing magnesium carbonate compositions in the conventional process heretofore practiced.

Heat insulating materials containing basic magnesium carbonate are generally made by forming an admixture of basic magnesium carbonate and asbestos fibres, the fibres being present to impart binding characteristics and additional strength to the product. The mixture of the basic carbonate and fibres is placed in suitable molds shaped in accordance with the desired design of the final product, and thereafter the molded product is subjected to a drying action. In forming the heat insulating material the proportions of the fibre and the basic magnesium carbonate are so proportioned that the final product contains about 85 per cent of basic magnesium carbonate. This product is generally referred to in commerce as 85 per cent magnesia.

In preparing the basic magnesium carbonate used in 85 per cent magnesia, a considerable proportion of the magnesium compounds obtained as a result of following the conventional procedure of manufacturing magnesium carbonate materials are lost in waste water and waste sludges. It has been estimated that magnesium compounds to the extent of 20-25 per cent of the magnesia values in the raw materials have been lost in the waste waters and sludge which have always in the past been discarded. In recovering the magnesia values from the waste waters and sludge a considerable reduction in cost of the manufacturing operations will be obtained. It is known that an aqueous suspension of calcium carbonate and magnesium carbonate, as, for example, 80 per cent calcium carbonate and 20 per cent magnesium carbonate, could be treated with a large excess of strong carbon dioxide gas to dissolve the magnesium carbonate forming a magnesium bicarbonate solution and leaving the calcium carbonate undissolved, but no economical method has thus far been developed to apply the above separation to plant operations.

Large quantities of magnesium carbonates have also in the past been wasted in the form of trimmings obtained during the sizing and finishing operations of crude molded basic magnesium carbonate products. These trimmings are usually in the form of a dust and small lumps. Additional quantities of magnesium compounds have been wasted when pipe lines, boilers, etc., are stripped of old magnesia insulating materials. Also, minerals, either calcined or uncalcined, containing relatively large proportions of magnesia values, such as serpentine, chrysotile, etc., but which are difficult to carbonate, may be utilized as a source of raw material in the operation of my present invention. Through the use of the carbonating procedure, as will be described in more detail below, the magnesia components in these products, some of which were previously considered waste materials, may be readily recovered, and the resulting recovered magnesium compounds may be used in preparing new magnesium compounds for various purposes.

It is, therefore, an object of this invention to recover magnesium compounds formerly lost in waste materials and sludge which will thus increase the plant capacity for the production of magnesium carbonate products by about 20-25 per cent. The plant capacity will be increased to this degree, since the volume of the materials passing through the equipment need not be increased in order to make the recovery of the magnesium compounds from the waste products effective. The recovered products are merely entered into the regular production cycle and the concentration of the magnesium solutions may be increased without detrimental effects which were previously encountered prior to the utilization of the present invention.

It is also an object of this invention to recover the magnesium compounds formerly lost in waste materials at a negligibly increased cost in operating expenses. The recovery operation may also be applied to recover magnesia values from trimmings, old magnesia insulation materials and difficultly carbonatable minerals. The necessary equipment for carrying on the present process is not very expensive, and the increased overhead expense as a result of the equipment and operating costs will be very small as compared to the value of the magnesium compounds now recovered but previously lost.

It is a further object of this invention to materially reduce the amount of steam required for precipitating the magnesium bicarbonate solutions, inasmuch as the concentration of the magnesium bicarbonate solution can be materially increased. Previously, it was undesirable to have too high concentrations of the magnesium bicarbonate solutions because of the fact that a substantial proportion of the magnesium compounds precipitated from the solution and were thereby lost in the waste waters and sludge.

However, through the application of the present novel procedure more fully described herein, the resulting increase in decomposition of the magnesium bicarbonate solutions is no longer of any significance, since the decomposed material is recovered. Thus, since the magnesium bicarbonate solutions may now be used at higher concentrations, the amount of steam formerly required for boiling magnesium bicarbonate solutions to precipitate the magnesium carbonate may be reduced.

Additional objects and benefits of the present invention will be apparent to those skilled in the art from the more detailed description of the novel method hereinafter set forth.

Broadly stated, the present invention includes the treatment of waste sludges and other difficultly carbonatable materials containing retained or absorbed soluble magnesium carbonate and insoluble magnesium carbonate with carbon dioxide gas to form water soluble magnesium compounds. The water-soluble magnesium compounds are then separated from the water-insoluble compounds, and the resulting solution containing the water-soluble magnesium compounds is used in conjunction with fresh magnesium compounds in the regular manufacturing cycle.

The invention will be illustrated by a more complete description in connection with the attached drawing, which shows a flow sheet of the preferred embodiment of the method for recovering magnesium compounds from waste materials. The broken line portion of the flow sheet is the conventional method heretofore used in manufacturing basic magnesium carbonate products. The portion of the flow sheet in heavy lines illustrates the procedure followed in my invention in recovering the magnesium compounds from the waste materials.

In the drawing illustrating a conventional method of manufacturing basic magnesium carbonate, dolomite mineral (composed primarily of magnesium carbonate and calcium carbonate) and coke are fed to a kiln and subjected to relatively high temperatures to convert the magnesium carbonate and the calcium carbonate to magnesium oxide and calcium oxide, respectively. During the calcining action, carbon dioxide gas is evolved as a result of the reduction of the magnesium carbonate and calcium carbonate to the respective oxides. The $CO_2$ gas is utilized in the high concentration carbonator and the low concentration carbonator, as will be described in more detail below in the subsequent steps of the operation.

After the dolomite ore has been sufficiently calcined to form magnesium oxide and calcium oxide, the materials are subjected to a slaking operation. In this operation water is mixed with the oxide mixtures and thereafter the slurry of the slaked materials, composed primarily of the magnesium hydroxide and calcium hydroxide, is then pumped to a series of high concentration carbonating tanks where the mixed hydroxides are subjected to the action of carbon dioxide gas. In the high concentration carbonating tanks, the concentration of the magnesia is in excess of 1.5 per cent expressed as basic magnesium carbonate (approximately six grams MgO per liter, or 0.6 per cent). The carbon dioxide gas is bubbled through the magnesium hydroxide and calcium hydroxide mixture in sufficient quantity to react with the magnesium and calcium compounds to form carbonate compounds. The substantially water-insoluble magnesium hydroxide is converted into a water-soluble magnesium bicarbonate and the calcium hydroxide is converted into a substantially water-insoluble calcium carbonate.

The magnesium bicarbonate solution containing the water-insoluble calcium carbonate is thereafter pumped to a settling tank wherein the water-insoluble components are permitted to settle to the bottom of the tank. A small percentage of the magnesium bicarbonate solution has a tendency to precipitate in the form of normal magnesium carbonate ($MgCO_3 \cdot 3H_2O$) which will settle with the calcium carbonate components in the bottom of the tank.

The substantially clear and sludge-free magnesium bicarbonate solution is then pumped to a precipitator and the solution is subjected to a heating operation. During the heating the magnesium bicarbonate will precipitate from the solution in the form of an insoluble magnesium carbonate which may be in the form of normal magnesium carbonate or the basic magnesium carbonate, and this reaction is accompanied by the evolution of considerable carbon dioxide. The precipitated magnesium carbonate is then placed into a filter or other dewatering device to remove the major portion of water, and the magnesium carbonate slurry is thereafter placed into suitable molds of any desired shape, followed, if necessary, by the application of pressure. If fibres are added to the material, the fibres may be added after a substantial proportion of the water has been removed from the slurry, that is, after the slurry has been passed through the filter.

The lime sludge obtained from the lime sludge thickener contains a substantial proportion of precipitated magnesium carbonate, retained or absorbed magnesium bicarbonate solution, calcium carbonate, and other compounds. The percentage of magnesia values in these sludge products, previously wasted, is very high, and it is advantageous to recover these magnesia values in order to increase the plant capacity over normal operations.

The sludge obtained from the lime sludge thickener is mixed with additional water until the mixture forms a comparatively thin slurry. It is preferable that the slurry be diluted with water to such a degree that the concentration of the magnesium carbonates is at least below 1.5 per cent expressed as basic magnesium carbonate (approximately six grams of MgO per liter or 0.6 per cent). It has been found that if a slurry be diluted still further so that the concentration of the magnesium carbonates would be approximately .5 per cent concentration expressed as basic magnesium carbonate (two grams MgO per liter or 0.2 per cent), more satisfactory results are obtained. Highly dilute solutions are desirable in order to obtain effective separation of the magnesium compounds from the insoluble calcium compounds. If the concentration of the magnesium carbonates is too high, a considerable proportion of the magnesium compounds will be lost with the calcium carbonate sludge which is discarded in a subsequent operation of the present process.

Trim materials, waste or discarded basic magnesium carbonate materials, difficultly carbonatable minerals, or other products containing magnesia values, are added at this point of the operation if such products are to be used in the operation. It is desirable to break or crush the products into a relatively fine condition and suspend the pulverulent materials in a large volume of water. The suspended materials should preferably be diluted to such a degree that the concentration of the slurry will not exceed the concentration of the diluted sludge as described above. Highly dilute solutions are desirable in order to obtain effective solution of the magnesia values during the subsequent carbonating action.

The highly diluted slurry is then subjected to a carbonation action in a series of low concentration carbonating tanks. In this operation carbon dioxide gas is passed through the diluted lime sludge mixture and/or other magnesia-containing materials until the water-insoluble magnesium compounds have been converted into water-soluble magnesium compounds.

From the low concentration carbonators the sludge is pumped to a thickening or settling tank and the water-insoluble calcium carbonate components and other insoluble components are permitted to settle to the bottom of the tank. The highly diluted magnesium bicarbonate solution is separated from the settled calcium carbonate sludge and pumped back into the manufacturing cycle either into the slaker or into an accumulator thickener tank. If no calcium carbonate components are present, as, for example, when treating waste trim or other basic magnesium carbonate materials, the settling tank operation may be omitted, since no calcium carbonate is present. In this case the magnesium bicarbonate solution may be pumped directly to the slaker or into the accumulator. The recovered magnesium bicarbonate solution will react with the calcium hydroxide or slaked calcined dolomite in the accumulator to form a substantially water-insoluble magnesium hydroxide.

The recovered magnesium bicarbonate solution may be reacted, if desired, with other water-soluble hydroxides, such as hydroxides of the alkaline earth metals or the alkali metals. Among the water-soluble hydroxides of the alkaline earth metals, such compounds as barium hydroxide or strontium hydroxide are satisfactory compounds to precipitate the magnesium bicarbonate as magnesium hydroxide. Hydroxides of alkali metals include sodium hydroxide, potassium hydroxide and ammonium hydroxide, and may be used in place of the calcium hydroxide described in the example. Calcium hydroxide is ordinarily used in my operation, but it is understood that other hydroxides as described above may be used to precipitate the magnesium bicarbonate solution and are included within the scope of the present invention. Calcium hydroxide may ordinarily be considered sparingly soluble as compared to the solubility of, for example, sodium hydroxide, but when compared with the substantially insoluble magnesium hydroxide it may be construed as substantially water-soluble, and for the purpose of the present specification and claims, calcium hydroxide will be defined as water-soluble in conjunction with other water-soluble hydroxides described above.

As an illustration of the procedure showing the effectiveness and high recovery of magnesia values in lime sludge, 1000 gallons of lime sludge was diluted with 6500 gallons of water. The diluted mixture had a concentration of magnesium carbonates of 0.67 per cent expressed as magnesium basic carbonate. The solids in the sludge were found by gravimetric analyses to be composed of 78 per cent calcium salts and 22 per cent magnesium salts. The diluted mixture was then subjected to a carbonating action by passing carbon dioxide through the mixture, and after carbonation of the diluted sludge 98 per cent of the magnesia was found to be in solution. The magnesium bicarbonate solution was then separated from the undissolved solids and added to the hydrated slaked dolomite entering the process.

Another example of the application of my invention, in order to illustrate the effectiveness thereof, is directed to the treatment of a mixture of plastic and calcined magnesium oxide. In this operation a slurry of a mixture of plastic and calcined magnesium oxide in sufficient quantity to give a total concentration of 1.75 per cent, expressed as magnesium basic carbonate (0.65 per cent plastic and 1.10 per cent magnesium oxide), was carbonated with substantially pure carbon dioxide gas at 40 lbs. gauge pressure. As a result of the carbonating action, 84 per cent of the total available magnesia entered into solution in forty minutes. However, when in accordance with my invention the same quantity of plastic (0.65 per cent available magnesia expressed as magnesium basic carbonate) was subjected to carbonation at 40 lbs. gauge pressure for twenty minutes, all the plastic was dissolved. The magnesium oxide was then added to the solution in the same quantity as used above, that is sufficient to give a potential concentration of 1.10 per cent, or a total concentration of 1.75 per cent. The magnesium oxide suspended in the magnesium bicarbonate solution was then subjected to further carbonation, and after twenty minutes of carbonation at 40 lbs. gauge pressure, 99 per cent of the total available magnesia was found to be in solution.

The two specific illustrations demonstrate the effectiveness of the present invention. It will be noted that substantially all of the magnesia enters into solution as magnesium bicarbonate when the substantially insoluble magnesia components are treated in accordance with the described procedure.

The method of recovering magnesium compounds from waste materials and waste sludges results in not only increasing the capacity of the plant by about 20 to 25 per cent, but also enables the use of higher concentrations of magnesium bicarbonate solutions. Even though magnesium compounds tend to precipitate from the solution at the higher concentrations, the magnesia values are readily recovered from the waste waters and sludges. Furthermore, since higher concentrations of bicarbonate solutions can be used satisfactorily without loss of too much of the magnesia value, less steam will be required to heat the magnesium bicarbonate solution in the precipitator due to the smaller volume of solution. Thus, when all the factors are considered, it will be evident that a substantial saving in operation and increased capacity are effected.

It is desirable that the recovery of the magnesium compounds from the lime sludge material or other magnesia products be effected at very low concentrations. If the solution is diluted to such a degree that a very low concentration of magnesium compounds exists in the solution, substantially complete recovery of the magnesium compounds is obtained.

The concentration of the carbon dioxide gas used in the carbonation of the waste materials and other sludges is preferably high. It is also desirable to have relatively high pressures forcing the gas through the carbonator in order to obtain effective carbonation of the magnesium compounds. If the gas used in the resaturation reaction has a carbon dioxide content in excess of 50 per cent by volume, excellent results will be obtained. If the concentration is lower, the reaction will be slower, but satisfactory results will be obtained although more time will be required before the treated materials may be added to the fresh stock in the accumulator thickener. Gases under relatively high pressure, as, for example, 60 to 100 pounds per square inch, in the carbonating units tend to accelerate the conversion of the water-insoluble magnesium compounds into water-soluble magnesium compounds.

The details given are for the purpose of illustration, not restriction, and variations within the spirit of the invention are intended to be included in the scope of the appended claims.

I claim:

1. The process of recovering magnesium carbonates from difficultly carbonatable magnesium compounds which comprises, forming a dilute aqueous suspension including substantially water insoluble magnesium compounds having a magnesium concentration of about 0.2–0.6% expressed as magnesium oxide, subjecting the aqueous suspension to the action of carbon dioxide gas under conditions adapted to convert the water insoluble magnesium compounds into water soluble magnesium bicarbonate, separating water insoluble compounds from the magnesium bicarbonate solution, admixing a water soluble hydroxide and magnesium hydroxide with the magnesium bicarbonate solution, reacting the magnesium bicarbonate solution with the water soluble hydroxide to form substantially water insoluble magnesium hydroxide, and subjecting an aqueous suspension of the magnesium hydroxide having a concentration calculated as magnesium oxide above 0.6% to the action of carbon dioxide under conditions adapted to produce magnesium bicarbonate.

2. The process of recovering magnesia in a suitable form for use in manufacturing molded magnesium carbonate products which comprises, forming a dilute aqueous suspension including calcium carbonate, magnesium carbonates and water soluble magnesium bicarbonate, said suspension having a magnesium concentration of substantially 0.2%–0.6% expressed as magnesium oxide, subjecting the aqueous suspension to the action of carbon dioxide gas to convert the water insoluble magnesium carbonates into water soluble magnesium bicarbonate, separating insoluble calcium carbonate from the magnesium bicarbonate solution, adding calcium hydroxide and magnesium hydroxide to the magnesium bicarbonate solution, reacting the magnesium bicarbonate solution with the calcium hydroxide to form substantially water insoluble magnesium hydroxide, and subjecting an aqueous suspension of the magnesium hydroxide having a concentration calculated as magnesium oxide above 0.6% to the action of carbon dioxide under conditions adapted to produce magnesium bicarbonate.

3. A cyclic process for manufacturing magnesium carbonate insulation products which comprises, calcining magnesium carbonate and slaking the resulting magnesia to form a dilute aqueous slurry of magnesium hydroxide, subjecting the slurry to a primary carbonation with carbon dioxide to produce soluble magnesium bicarbonate, heating the magnesium bicarbonate liquor to precipitate magnesium carbonate, concentrating the magnesium carbonate by filtration to a molding consistency and molding, curing and trimming shaped products to specified dimensions, forming a dilute aqueous suspension of waste magnesium carbonate products of the said manufacturing operation having a magnesium concentration calculated as magnesium oxide in the range .2%–.6%, subjecting said dilute suspension to a secondary carbonating treatment with carbon dioxide under conditions adapted to convert substantially all of the magnesium carbonate present to soluble magnesium bicarbonate, converting the dilute bicarbonate liquor thus formed to magnesium hydroxide, and using the thus formed magnesium hydroxide to increase above 0.6% the normal concentration of magnesium oxide in the aqueous magnesium hydroxide subjected to the primary carbonation treatment.

4. A cyclic process for increasing utilization of magnesia values in the manufacture of magnesium carbonate insulation products, which comprises, slaking calcined dolomite to form a dilute aqueous slurry of magnesium hydroxide and calcium hydroxide, subjecting the slurry to a primary carbonation with carbon dioxide to produce soluble magnesium bicarbonate and insoluble calcium carbonate, separating the calcium carbonate from the magnesium bicarbonate liquor as a lime sludge, heating the magnesium bicarbonate liquor to precipitate magnesium carbonate and molding said product to shapes which are then cured and trimmed to dimensions, and recovering magnesia values from waste magnesium carbonate containing products of the said manufacturing operation by forming an aqueous slurry suspension thereof with a magnesium concentration calculated as magnesium oxide in the range .2%–.6%, subjecting said dilute suspension to a secondary carbonating treatment with carbon dioxide under conditions adapted to convert substantially all of the magnesia values to soluble magnesium bicarbonate, separating the dilute magnesium bicarbonate liquor thus formed from any insoluble residue of the treatment, and mixing the dilute bicarbonate liquor, water, and calcined dolomite in the hydrating zone in such proportions as to give a magnesium oxide content above .6% in the slurry suspension subjected to the primary carbonation treatment.

5. The cyclic process of preparing magnesia in a form suitable for use in manufacturing molded magnesium carbonate products, which comprises calcining a dolomite ore forming a mixture of calcium oxide and magnesium oxide, hydrating said oxides and forming a dilute aqueous suspension of calcium and magnesium hydroxides, subjecting the mixed hydroxides to the carbonating action of carbon dioxide gas and separating the thus formed water-soluble magnesium bicarbonate solution from the precipitated calcium carbonate sludge, and recovering magnesia values including soluble bicarbonate and insoluble carbonates from the said sludge by forming an aqueous slurry suspension of the sludge with a magnesium concentration calculated as magnesium oxide of less than 0.6%, subjecting the aqueous slurry mixture to the action of carbon dioxide gas to convert the precipitated magnesium carbonate to a water-soluble magnesium bicarbonate, separating the water-insoluble calcium carbonate from the magnesium bicarbonate solution, and finally mixing the magnesium bicarbonate solution, water, and the calcined dolomite in the hydrating zone, in such proportions as to provide a magnesium oxide content above 0.6% in the suspension subjected to the primary carbonation treatment.

THOMAS C. ATCHISON.